US011128325B2

(12) United States Patent
Dinan et al.

(10) Patent No.: US 11,128,325 B2
(45) Date of Patent: Sep. 21, 2021

(54) WEARABLE DEVICE WITH ANTENNA

(71) Applicant: Armour Surveillance Security Equipment and Technology Ltd., London (GB)

(72) Inventors: Richard Dinan, Bucks (GB); Patrick James Fawcett, Worcestershire (GB); William Damerell, Hants (GB)

(73) Assignee: Armour Surveillance Security Equipment and Technology Ltd., London (GB)

( * ) Notice: Subject to any disclaimer, the term of this patent is extended or adjusted under 35 U.S.C. 154(b) by 14 days.

(21) Appl. No.: 16/038,361

(22) Filed: Jul. 18, 2018

(65) Prior Publication Data

US 2019/0036556 A1    Jan. 31, 2019

(30) Foreign Application Priority Data

Jul. 25, 2017    (GB) ..................................... 1711985

(51) Int. Cl.
  *H04B 1/034*    (2006.01)
  *H01Q 1/27*    (2006.01)
  (Continued)

(52) U.S. Cl.
  CPC ............ *H04B 1/0343* (2013.01); *H01Q 1/273* (2013.01); *H01Q 1/36* (2013.01); *H01Q 1/38* (2013.01);
  (Continued)

(58) Field of Classification Search
  CPC ........ H04L 31/0343; H01Q 1/36; H01Q 1/38; H01Q 9/30; H01Q 9/065; H01Q 1/273;
  (Continued)

(56) References Cited

U.S. PATENT DOCUMENTS

2008/0049560 A1\* 2/2008 Clarkson ............ G04B 37/1486
                                                             368/281
2008/0238667 A1\* 10/2008 Olson ................ G06K 19/0723
                                                             340/541
(Continued)

FOREIGN PATENT DOCUMENTS

GB          2201266 A      8/1988
WO      2017051990 A1      3/2017

*Primary Examiner* — Yuwen Pan
*Assistant Examiner* — Fatuma G Sherif
(74) *Attorney, Agent, or Firm* — Meunier Carlin & Curfman LLC (57) ABSTRACT

Embodiments of the present invention provide a wearable device (200) suitable for wearing on a person's wrist and comprising a metallic housing (203) and a flexible band (202) for attachment of the device to a user's wrist. The metallic housing includes a printed circuit board (PCB) (702) on which is mounted electronic components (710) including a transmitter for transmitting radio signals at a frequency between 400 and 1000 MHz. A coin-cell battery (502) powers the device. The battery is disposed in an inner core (406,406') of the flexible band. An antenna is connected to the PCB for radiating said signals. In one embodiment the antenna comprises a coil (504,506) of wire disposed in said section of the band. The wire is of substantially a quarter wavelength in length based on the transmission frequency of the radio signals, and comprises the electrical connections between the battery and PCB. In a second embodiment, the transmitter comprises a coaxial cable connector and a coaxial cable having a terminal for connection to said coaxial cable connector. The coaxial cable extends out of said housing into said section to an antenna disposed in said section.

23 Claims, 5 Drawing Sheets

(51) Int. Cl.
  *H01Q 7/00* (2006.01)
  *H01Q 1/36* (2006.01)
  *H01Q 1/38* (2006.01)
  *H01Q 9/30* (2006.01)
  *H01Q 9/06* (2006.01)
  *H01Q 1/32* (2006.01)
  *G07C 9/29* (2020.01)

(52) U.S. Cl.
  CPC ............... *H01Q 7/00* (2013.01); *H01Q 9/065* (2013.01); *H01Q 9/30* (2013.01); *G07C 9/29* (2020.01); *H01Q 1/3233* (2013.01)

(58) Field of Classification Search
  CPC .......... H01Q 7/00; H01Q 1/3233; G07C 9/29; G07C 9/00904; G07C 2009/00587; H04B 1/0343; H04B 1/385; B60R 25/10
  See application file for complete search history.

(56) References Cited

U.S. PATENT DOCUMENTS

| | | | | |
|---|---|---|---|---|
| 2012/0122519 | A1* | 5/2012 | Jochheim | H04B 1/385 455/556.1 |
| 2014/0153211 | A1* | 6/2014 | Malek | H01Q 1/243 361/809 |
| 2014/0248846 | A1* | 9/2014 | Yanagisawa | H03F 3/193 455/234.1 |
| 2015/0346877 | A1* | 12/2015 | Justice | G06F 3/047 345/173 |
| 2016/0035164 | A1* | 2/2016 | Wu | G07C 9/00309 340/5.61 |
| 2016/0322999 | A1* | 11/2016 | Kim, II | H04B 1/385 |

* cited by examiner

WEARABLE DEVICE WITH ANTENNA

TECHNICAL FIELD

The present disclosure relates to wearable device, in particular a band-like device to be worn on the wrist of a person in the same manner as a wristwatch or article of jewelry, such as a bangle. The wearable device may be of the type comprising a radio transmitter that signals equipment in the vicinity of the device and as such includes an antenna for generating and/or receiving radio signals.

BACKGROUND

Wearable devices that perform functions without direct physical contact between a user (a wearer of the device) and a system operated or activated by the device are increasingly popular. One application having current applicability is a remote key fob that constantly (or intermittently or selectively) generates a weak radio signal capable of being detected by a radio receiver in a vehicle whereby the vehicle may be activated. For example, as a user carrying the device approaches a vehicle, the vehicle may be unlocked enabling entrance to the vehicle and the ignition to be enabled, allowing just the press of a button, for example, in the vehicle to start the vehicle operating. The device may have a button (as many remote key fobs presently employ) to unlock vehicles at a distance from them, rather than automatically unlocking on arrival at the vehicle.

Such wearable devices are electrically powered and require a battery to power electrical circuits in the device that generate the radio signals. Such battery must be replaceable, or be rechargeable, or the device will only have a lifetime as long as the battery remains sufficiently charged. Wearable devices that generate radio signals are subject to restrictions in most jurisdictions, because there is clearly a danger of interference with systems other than the one intended. In North America, ultra-high frequency (UHF) transmissions can be used unlicensed for 902-928 MHz (±13 MHz from the 915 MHz center frequency), but restrictions exist regarding transmission power. In Europe, radio frequency identification devices (RFID) and other low-power radio applications are regulated by the European Telecommunications Standards Institute (ETSI) recommendations EN 300 220 and EN 302 208, and by the European Radiocommunications Office (ERO—now European Communications Office (ECO)) recommendation 70 03, allowing RFID operation with somewhat complex band restrictions from 865-868 MHz. UHF bandwidth across the European Union ranges from 865 to 868 MHz, with interrogators able to transmit at maximum power (2 watts ERP) at the center of that bandwidth (865.6 to 867.6 MHz). RFID UHF bandwidth in North America ranges from 902 to 928 MHz, with readers able to transmit at maximum power (1 watt ERP) for most of that bandwidth. Australia has allotted the 920 to 926 MHz range for UHF RFID technology. And European transmission channels are restricted to a maximum of 200 kHz in bandwidth, versus 500 kHz in North America. China has approved bandwidth in the 840.25 to 844.75 MHz and 920.25 to 924.75 MHz ranges for UHF tags and interrogators used in that country. Until recently, Japan did not allow any UHF spectrum for RFID, but it is looking to open up the 960 MHz area. In the United Kingdom and elsewhere, 886-906 MHz and 433.05-434-79 MHz (amongst others), are reserved frequency bands for industrial, scientific and medical use that includes applications for domestic use such as vehicle remote key and television remote controls.

Such devices may be partly or wholly passive, being at least woken and activated by a signal received from the system it is intended to operate. Wholly passive devices are powered by radio signals from the source, but since this is generally very low power, the range of any responding signal from the device is inevitably short (less than a metre or thereabouts), which is generally considered inadequate for vehicle remote key operation. Consequently, they may be only partly passive, being activated by received signals. This has the benefit that the device is entirely quiescent unless within range of the source it is intended to signal, which could be many metres.

Transmissions of radio signals at UHF frequencies, which have the power to penetrate relatively radio-opaque objects, require an efficient antenna if the power consumption of the transmitter is not to be significant. Vehicles are (albeit poor or incomplete) Faraday cages, whereby transmission of signals into and from vehicles is relatively difficult. Furthermore, the wearable device of the present invention needs to be aesthetically pleasing, as it is intended to be worn in like manner to a wrist watch. As such, the device may be made of precious metal, such as gold or platinum and indeed, be encased in such material making the transmission of radio signals from electronic components inside such a casing difficult.

Wrist-wearable devices tend to be of two sorts, a rigid bangle, worn loosely on the wrist, or, more usually, a rigid component forming a housing for delicate electrical and/or mechanical elements of the device and a flexible strap for close-fitting attachment of the device to the wrist.

Resonant frequency antennas, either dipoles or monopoles, at the frequencies just mentioned, need to be the order of 1.0 or 1.5 metre in length for full wavelength antennas. For quarter wavelength antennas 200-400 mm length is needed and this is problematic.

It is an object of embodiments of the invention to at least mitigate one or more of the problems of the prior art.

SUMMARY OF THE INVENTION

The present invention provides, in a first aspect, a wearable device suitable for wearing on a person's wrist and comprising a metallic housing and a flexible band for attachment of the device to a user's wrist,
  wherein the metallic housing includes a printed circuit board (PCB) on which is mounted electronic components including a transmitter for transmitting radio signals at a frequency between 400 and 1000 MHz;
  wherein a coin-cell battery powers the device, the battery being disposed in a section of the flexible band and electrical connections being provided between the battery and PCB;
  wherein an antenna is connected to said PCB for radiating said signals; and
  wherein said antenna comprises a coil of wire disposed in said section of the band, said wire is of substantially a quarter wavelength in length based on the transmission frequency of the radio signals, and comprises said electrical connections.

In one embodiment, the antenna boosts signal generated by the transmitter on a transmitter element on the PCB within the housing. The signal transmitted by the transmitter element may be communicated to the antenna by one or both of:
  a. reception of stray radio signal from the transmitter element; and b. electrical conduction of the signal through tracks of the PCB.

The term "coin-cell battery", as used herein, should be understood to refer also to rechargeable power supply elements including capacitors, unless the context makes clear otherwise. A non-rechargeable lithium cell battery, about the size of a coin, is typically contemplated, but is not essential.

Said wire forming said electrical connections may constitute a dipole antenna of equal length on either side of said battery. The wire may be of insulated copper, conveniently of diameter between 0.25 and 0.75 mm. The coil may have a diameter between 2 and 4 mm, optionally between 2.5 and 3.0 mm, optionally about 2.8 mm in diameter, but whatever diameter fits in the space available is acceptable. The wire of the coil on each side of the battery can be between 10 and 20 mm long.

In a second aspect, the present invention provides a wearable device suitable for wearing on a person's wrist and comprising a metallic housing and a flexible band for attachment of the device to a user's wrist,
  wherein the metallic housing includes a printed circuit board (PCB) on which is mounted electronic components including a transmitter for transmitting radio signals at a frequency between 400 and 1000 MHz;
  wherein a coin-cell battery powers the device, the battery being disposed in a section of the flexible band and electrical connections being provided between the battery and PCB; and
  wherein the transmitter comprises a coaxial cable connector, a coaxial cable having a terminal for connection to said coaxial cable connector and extending out of said housing into said section to an antenna disposed in said section.

Said antenna may be a monopole antenna. It may comprise a sinusoidal or square wave track printed on a flexible sheet.

In either aspect of the present invention, said section of the flexible band may comprise a moulding of polyurethane elastomer. Conveniently, said antenna and battery may be embedded in said moulding, the polyurethane elastomer and antenna forming a composite antenna, said electrical connections protruding from said moulding for connection to the PCB. In the case of the second aspect of the present invention, said coaxial cable also protrudes from said moulding for connection to the PCB.

Both aspects of the present invention provide for an effective transmission (and possibly reception) of radio signals from (and to) the electronic components mounted on the PCB and received within the metallic housing, which has the effect of creating a Faraday cage around the PCB and attenuating radio frequency signal generated by the PCB (or to be received by the PCB). Furthermore, by disposing the battery outside the housing, this means that the housing can be minimised in size.

In the case of the first aspect of the invention, where the electrical connections from the battery are extended and coiled, and constitute an antenna for re-transmitting signals from, and receiving and communicating signals to, the PCB, it is found that some frequencies work better than others. The PCB needs to be designed such that electrical noise is able to oscillate on the power supply lines. This is not always straightforward, as noise on power lines can cause undesirable effects on other logic signals within the integrated circuits, and is therefore usually suppressed as a precaution. Suppressing noise would prevent the coil antennas of the first aspect of the present invention from being able to carry and transmit a signal.

This effect is mitigated by the second aspect because the radio transmission is separated from the electrical connections of the battery.

Said antenna may be a monopole antenna. The antenna may be a sinusoidal or square wave track printed on a flexible sheet.

Alternatively, said antenna may be the exposed core of said coaxial cable within said section and beyond a termination of a radio-frequency-shielding sheath of the coaxial cable. Said section may include a backbone having grooves or notches around which said exposed core is wound.

The backbone may comprise a clamp securing said coaxial cable to the backbone and providing strain relief to the side of the coaxial cable comprising said termination and core and in respect of tension in the coaxial cable on the other side of the clamp. Said clamp may also serve to secure the battery and its electrical connections to the backbone.

The clamp may be formed by a base and a former defining a groove therebetween to receive and clamp the coaxial cable on engagement of tightening means. A corresponding groove may be provided on an underside of the former terminating in an aperture in the former opening on its topside as a track in the topside, turning the core of the coaxial cable when received therein so as to facilitate winding of the core around the former, alternating grooves being formed on the topside and underside to receive the core.

In a third aspect of the present invention, there is provided a wearable device suitable for wearing on a person's wrist and comprising a rigid housing and a flexible band for attachment of the device to a user's wrist,
  wherein the rigid housing includes first electronic components providing functionality for the device; and
  wherein the flexible band comprises a section moulded from resiliently flexible plastics material in which is embedded further electronic components of the device, an electrical connection between said first and second electronic components bridging said rigid housing and flexible band.

Optionally, said section comprises a head received through an opening in said rigid housing, which opening is sealed by said head, and through which head said electrical connection passes.

Said further electronic components may comprise a coin-cell battery and an antenna.

The battery is disposed in a battery region of the section, where the section is of reduced flexibility, a flex region being between said battery region and said head, and a tail region being on the other side of said battery region with respect to said flex region, which flex and tail regions are resiliently flexible.

A connection region of the section may be between said head and flex region, fixing means being provided to secure said connection region to said housing.

The section of the flexible band may be connected to the housing by mechanical fixation through holes defined in the section. The section may be received in a pouch comprising a rubber tray fixed to a leather lid covering the section in the tray. In that respect, the section forms an inner core of the band.

Said pouch may comprise a resiliently flexible elastomeric tray and a lid attached around a lip of the tray and providing an aesthetic cover of the band over the inner core. Said aesthetic cover may be a leather strap stitched to the lip.

Either or both said tray and lid may have at least two apertures coinciding with said apertures in the section to also receive said fasteners and secure the pouch also to the housing. Said pouch may also be connected to the housing by said mechanical fixation through holes in the pouch with the holes in the section. The pouch may form a first element of the band having, at its end remote from its connection to the housing, means for releasable connection to a second element of the band, which second element may be connected to a side of the housing remote from connection of the pouch to the housing. Said releasable connection means may comprises a buckle or a clasp, such as a deployment clasp, or a magnetic clasp.

The housing on its side remote from the section may have an extension comprising a first latch for separable connection to a second latch. The second latch may have a resiliently flexible part connected thereto that matches the pouch connected to the housing.

Said flexible part and pouch may be interconnected at their ends remote from the housing by a selectively expandable mechanism that completes the band of the device.

Any of the features defined above may be employed in any of the different aspects of the present invention, unless clearly mutually exclusive. A wearable device suitable for wearing on a person's wrist as defined above finds application as a remote control for keyless entry to a vehicle, or as a remote control for keyless entry to a building or to a room within a building. As such, it may further comprise a button on the housing by which to activate the device to communicate with a specified vehicle or house to unlock the vehicle or house to permit entry to a user wearing or otherwise carrying the device.

In some applications, the device may be required to receive radio signals, for example to activate it remotely. In that event the transmitter may comprise a transceiver.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DETAILED DESCRIPTION

Figure 1:
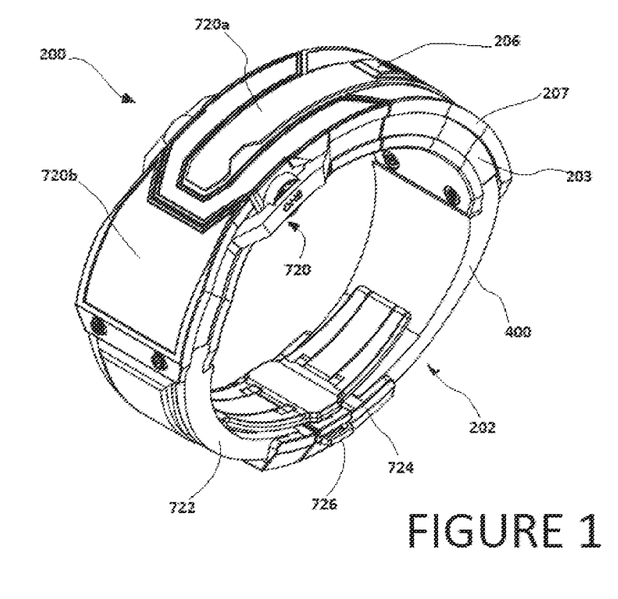
FIG. 1 shows a wearable device in accordance with the invention.

In FIG. 1, a wearable device 200 comprises a band 202 of dimensions to fit loosely around the wrist of an adult person. Means (not shown) may be provided to adjust the fit to suit different wrist dimensions. A rigid housing 203 encloses electronic components disposed on a printed circuit board (not visible in FIG. 1). The model shown in FIG. 1 includes a non-rechargeable battery (not visible). While the description herein refers primarily to a coin cell disposable (and normally non-rechargeable) battery, it should be borne in mind that such does not exclude the battery being rechargeable.

Figure 2A:
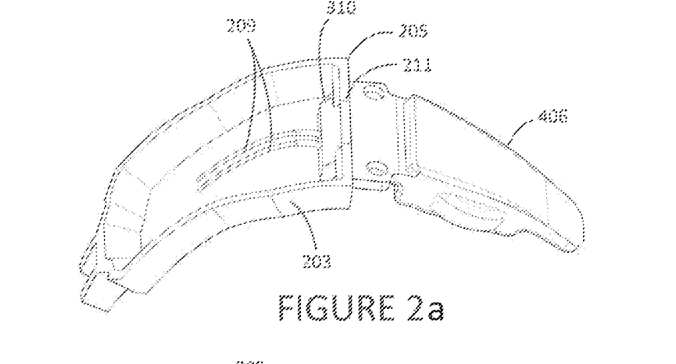
FIGS. 2a and b show a housing for electronic components and a flexible section of a band of the device (of FIG. 1)
Figure 2B:
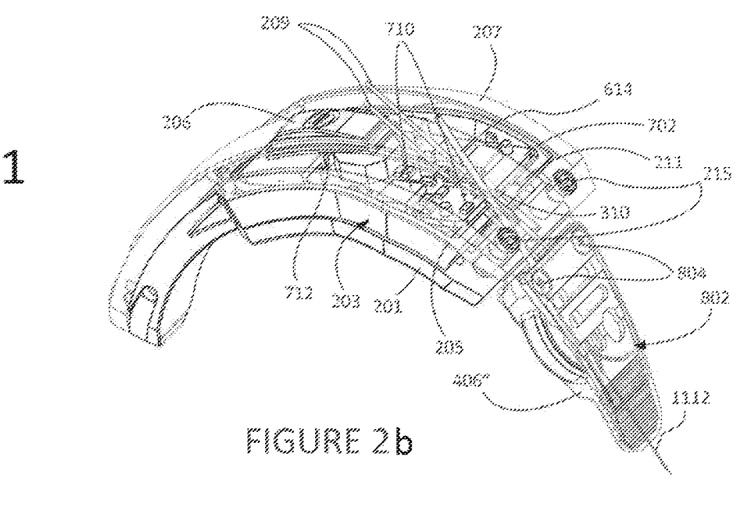

In FIGS. 2a and 2b, the rigid housing 203 comprises an open base 205 and a lid 207, together seated on a precious metal base 201. The lid 207 has a button 206 for user operation. Inside the housing 203 is disposed a printed circuit board 702 that is supplied with electrical power by two wire leads 209 that enter the housing 203 from one end that is connected to the flexible band 202 (omitted in FIGS. 2a and 2b).

Figure 4:
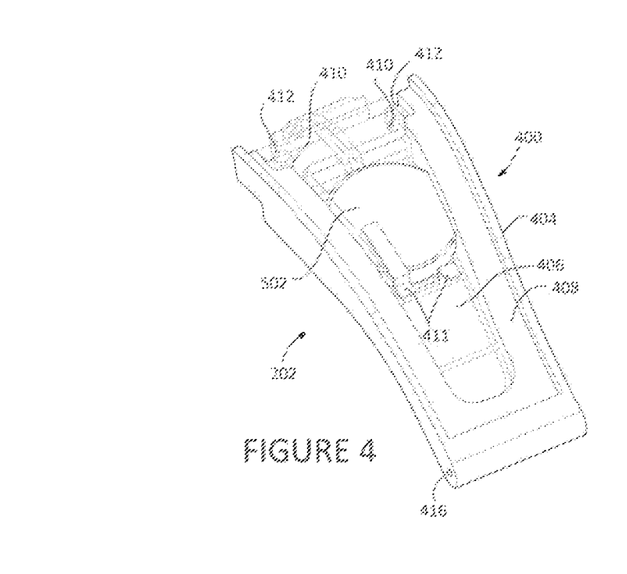
FIG. 4 shows the flexible inner core of the band disposed in a tray of a flexible pouch forming part of the band of the device.

Turning to FIG. 4, the flexible band 202 comprises a pouch 400 made up from a flexible rubber or elastomer tray 404, a moulded polyurethane inner core 406 disposed in the tray, and a leather or like aesthetically pleasing covering (not shown) stitched or otherwise fixed to the open face 408 of the tray 404.

Figure 3:
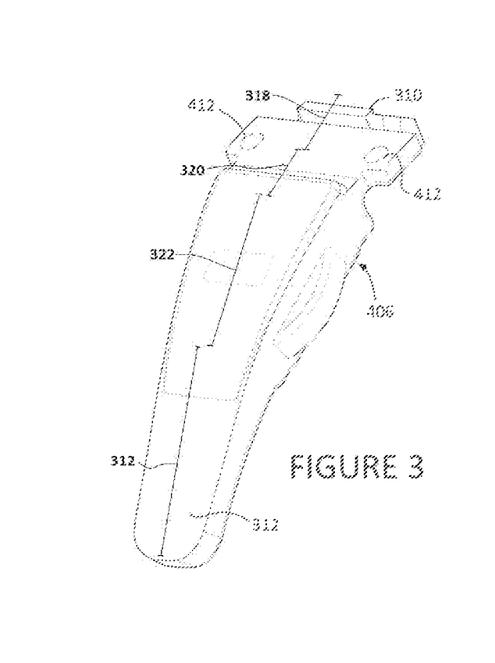
FIG. 3 shows the flexible inner core of the band.

The tray 404 has holes or apertures 410 to receive fixings 215 for connection of the band 202 to the rigid housing 203. The inner core 406 has corresponding holes 412 through which the same fixings 215 also secure the inner core 406 to the housing 203. The tray 404 has a through hole 416 at its other end for connection of a buckle arrangement (not shown) to complete the band 202. (In FIG. 2, a different embodiment of inner core 406" (described further below) is shown attached to the housing 203, with the pouch 400 omitted.) The inner core 406 is shown alone in FIG. 3, where it can be seen to include a head 310 adapted to fit in and seal an aperture 211 (see FIG. 2) of the housing 203 and locate the wires 209 on entry into the housing 203. The head 310 is hammer shaped having a neck around which the opening 211 fits in a sealing manner. As mentioned above, inner core 406 is constructed from polyurethane (or similar) material which is moulded over a coin cell battery 502 (see FIG. 5) to which wire leads 209 have previously been connected to terminals 411. The wire leads are coated with insulation to prevent short-circuiting between them. The inner core 406 therefore has four distinct regions:

a connection region 318, comprising the head 310 and that part of the section having the holes 412, which region is secured by fixings 215 and clamped between lid 207 and base 201;

a battery region 322 where the battery 502 is embedded;

a flex region 320 between the battery region 422 and the connection region 418 and intended to flex; and the tail region 312.

Figure 5:
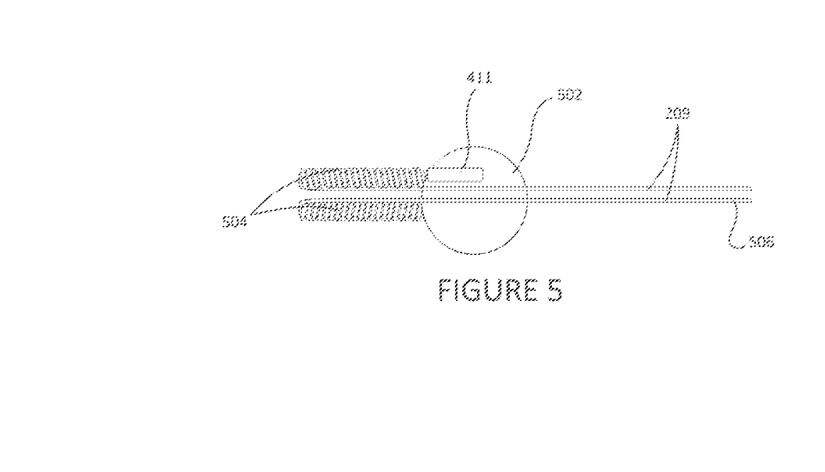
FIG. 5 shows a coin cell battery and electrical leads connected thereto, also forming an antenna for a device in accordance with a first aspect of the present invention.

In FIG. 5, in accordance with a first aspect of the present invention, it can be seen that each wire lead 209 is formed into a coil 504 to one side of the battery before turning and terminating at 506 on the other side of the coil. In one embodiment, the wire is between 0.25 and 0.75 mm in diameter, conveniently 0.5 mm in diameter. The coil has a diameter between 2 and 4 mm, optionally between 2.5 and 3.0 mm, optionally about 2.8 mm in diameter, and with a length between 30 and 40 mm. Thus, the wire of the coil 504 on each side of the battery is between 100 and 200 mm long.

This length is suitable for broadcast at 433 MHz where the wire acts as a quarter wavelength dipole antenna at 30 Ohms. A shorter length of between 50 and 100 mm (for example about 60 mm) would be employed for higher frequencies (for example 915 MHz). About 70 mm of the wire in either case may be uncoiled at the terminating end 506.

The battery, with leads connected, is clamped in an injection mould (not shown) and polyurethane is injection-moulded around the battery and leads to form the flexible inner core 406 as shown in FIG. 3, with the coils 504 disposed in a tail 312 of the inner core 406 and the lead terminals 506 exiting through the head 310. The tail 312 is flexible, notwithstanding the embedded coils 504, which are themselves flexible by nature. The battery region 422 of the inner core 406 around the battery cannot, of course, flex, but the flex region 420 between the battery 502 and connection region 420 is flexible.

The second aspect of the invention has essentially the same construction of the inner core 406' (see FIG. 6) except that the wire leads 209 are directly connected to the terminals 411 of the battery 502 without being formed into coils. Instead, a flexible sheet-antenna 604 is provided comprising a flexible plastics sheet 606 on which is printed a single sinusoidal or square wave track 608. The flexible printed circuit board 604 is typically formed of polyamide material with copper tracks. A 3-dimensional antenna track can also be created by using vias between track layers. A coaxial cable connector 610 is disposed on the sheet. A coaxial cable 614, provided with a complimentary connector 612, is connected to the sheet-antenna 604 and positioned in the mould with the cell 502 and its leads 209. After moulding of the body of the inner core 406' around the battery 502, leads 209, sheet-antenna 604 and its cable 614, the inner core 406' has the same arrangement as the inner core 406 described above, except for the coaxial cable 614 also extending from its head 310.

In either case, the leads 209 of the inner core 406,406' are connected to the printed circuit board (PCB) 702 and, in the case of inner core 406', its coaxial cable 614 has a further connector (not shown, but corresponding to the connector 612) on its free end for connection to a complimentary connector (not visible in FIG. 2) on the PCB 702. The PCB 702 includes circuit elements 710 not described further herein other than to say, in the case of a vehicle remote key device, it comprises components and button(s) 712 to provide the functionality required to communicate with a vehicle and to operate its locking and other functions (eg boot opening, window closing etc). This may comprise a single button operation (206/702), multiple/timed pressing of the single button, or multiple buttons (only one being shown). The exact functionality depends on the vehicle and key to be provided.

Also dependent on the vehicle, and the country of operation, will be the frequency of the radio communication. In the case of vehicles, European vehicles tend to employ a frequency band in the region of 433 MHz, whereas the United States tends to employ a frequency band in the region of 915 MHz. Of course, signals are coded so that they are unique to a particular vehicle.

In the case of the first aspect of the present invention, the signal transmitted by a transmitter mounted on the PCB is picked up and re-transmitted by the antenna formed by the electrical connection leads 209. Without being bound to a particular theory, the radio signal is communicated to the antenna by one or both of reception by the wires 209 of stray radio signal from the transmitter element that escapes the housing 203, and retransmission thereof, and direct electrical conduction of the signal through tracks of the PCB and onto the wires 209. The arrangement works to boost the range of the transmitter, which would otherwise be inadequate (at least, the range is short) without much greater power being applied than a simple coin cell battery can supply for a reasonably prolonged period of time. The circuit may be designed to that dampen noise on the power supply. Power line noise suppression has the effect of suppressing re-energised signals on the external transmitting wires 209 and particularly at higher frequencies in the 915 MHz region. The resultant transmission range of the device 200 may not be sufficient, even with the arrangement of FIG. 5.

Figure 6:
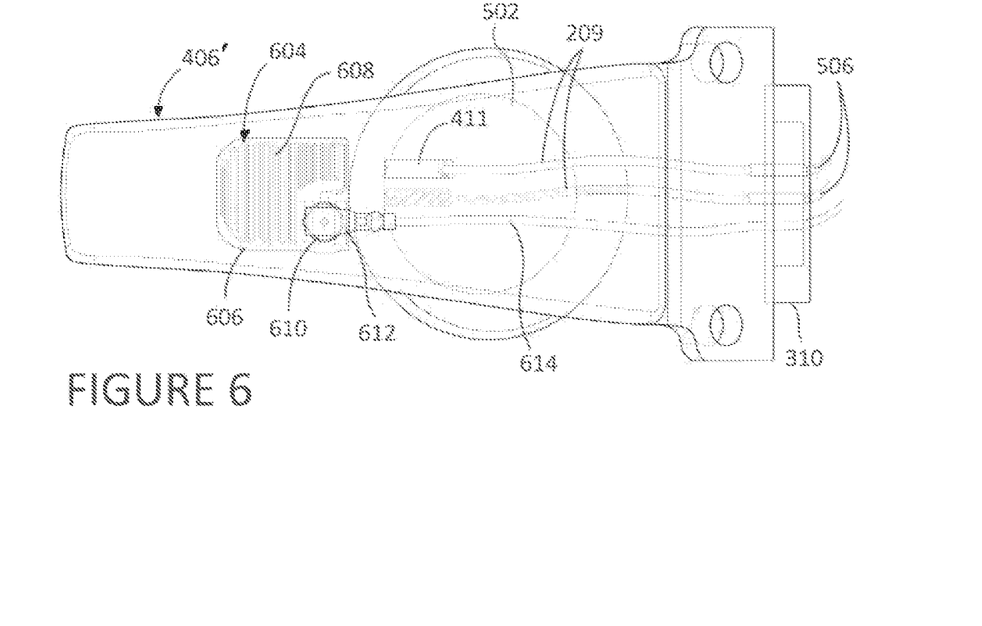
FIG. 6 shows the flexible inner core of the band, with a printed antenna and coaxial cable, for a device in accordance with a second aspect of the present invention.
Figure 7:
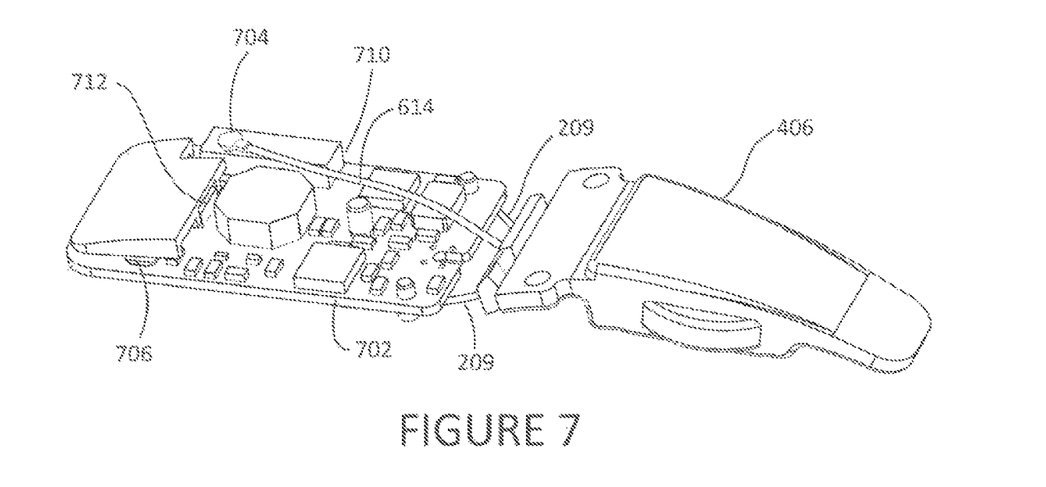
FIG. 7 shows a device in accordance with the present invention in an open condition.
Figure 8:
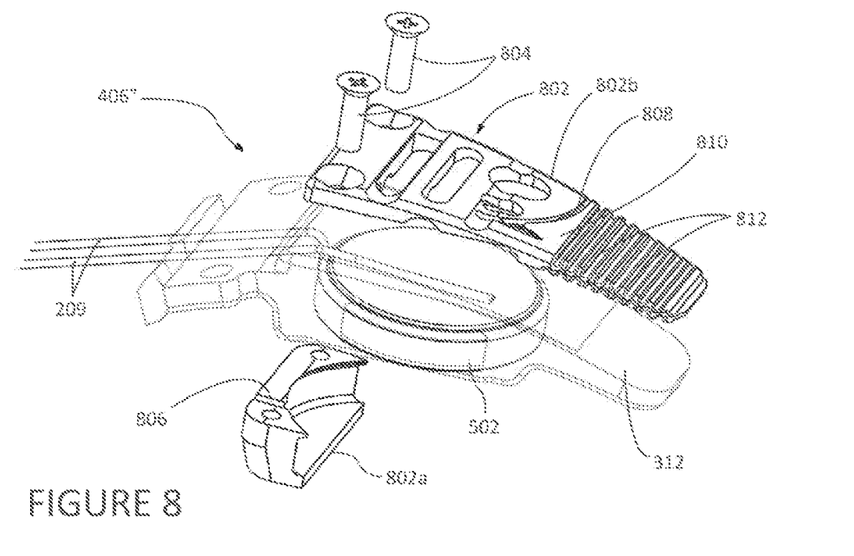
FIG. 8 shows an exploded view of another embodiment of a flexible inner core of a device in accordance with the second aspect of the invention.

The second aspect of the present invention provides the coaxial connector 706 on the PCB 702 to receive the signal to be transmitted by its on-board transmitter (not shown) and communicates that signal through the shielded coaxial cable 614 to the flexible sheet-antenna 604 in the flexible inner core 406' outside of the housing 203. The flexible sheet-antenna 604 is a monopole antenna and of course could be replaced by coiled wire where the coaxial cable terminates, if preferred.

It should be pointed out that the precise length of wire/track for the antenna 209/604 depends on a number of factors and is subject to some experimentation to establish the most efficient length for a particular situation. The frequency of transmission is the primary determinant, but the encapsulation of the antenna within the polyurethane inner core 406,406' also affects the optimal frequency of the antenna, effectively creating a composite antenna comprising both the polyurethane and the wire 209/track 608.

Referring to FIGS. 8 to 11 (and also as shown in FIG. 2), another embodiment 406" of the over-moulded section is shown, comprising an injection moulded backbone 802 formed from a base 802a and former 802b. Base and former are clamped together by fasteners 804 around the coin-cell battery 502. Coaxial cable 614 (not visible in FIG. 8) is clamped between the base and former in groove 806 of the base near a termination 1110 (see FIG. 11) of the cable, providing strain relief for the coaxial cable in the inner core 406". The cable has an RF shielding sleeve 1114 and out of which extends the core 1112 of the cable to form the requisite antenna. The length of the core 1112 beyond termination 1110 may be approximately 20 mm (dependent on the frequency of RF transmission and dielectric properties of the polymer employed to mould the inner core 406" and backbone 802). Prior to clamping the base and former together, the core 1112 is threaded through an aperture in the former (which aperture is not visible, but is disposed at the end of a track 808, formed on a top surface 810 of the former 802b, and at the end of a deep groove 1000 formed on an underside 811 of the former 802b—see FIG. 10). The RF shielding sleeve 1114 and termination 1110 is received in the deep groove 1000. The free end of the core 1112 is led around the track 808 and subsequently wound around the former 802b, received in alternating cross-grooves 812 in its top and bottom surfaces 810, 811. The grooves 812 also serve to increase the flexibility of the former, and inner core 406", once moulded.

Once the cable 614 is clamped between the base 802a and former 802b, around the cell 502, the leads 209 extend from the cell along a channel 1002 on the underside 811 of the former 802b. The backbone 802 is then inserted in a mould as described above and the whole is encapsulated in appropriate elastomer such as polyurethane to form the inner core 406". The cable 614 and leads 209 extend together out of the end 310 of the inner core 406" for connection to the PCB 702 as described above with reference to FIG. 2.

Figure 9:
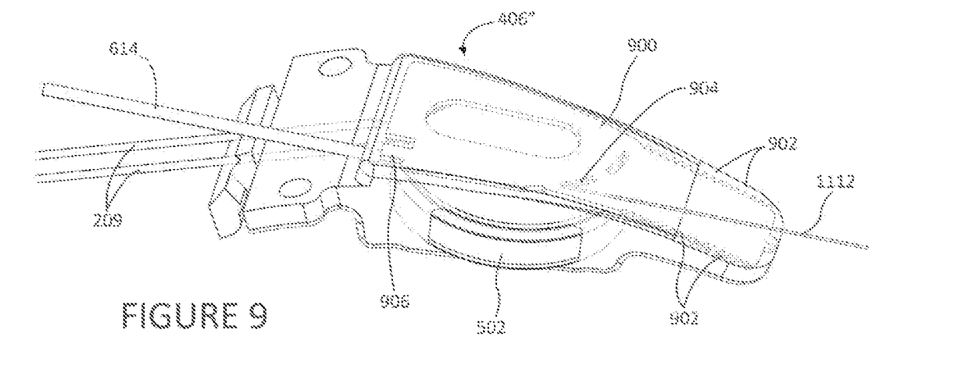
FIG. 9 shows an exploded view of another embodiment of a flexible inner core of a device in accordance with the second aspect of the invention.
Figure 10:
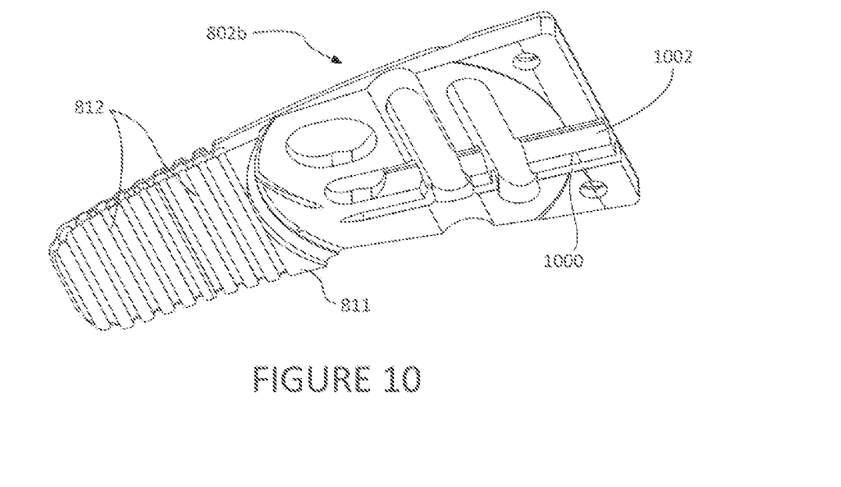
FIG. 10 is an underside view of a backbone of the flexible inner core of FIG. 8.
Figure 11:
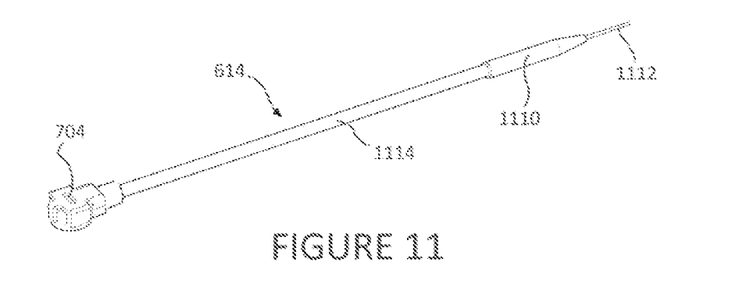
FIG. 11 is a coaxial cable with its core exposed.

An alternative form of backbone 900 is shown in FIG. 9, comprising a simple sheet of plastics material and having notches 902 in its edge by which to guide the coil of core 1112 when wound around the backbone 900. An eye 904 enables the core to be fed from under the backbone 900 to commence winding around the backbone. A tab 906 provides a location for a cable tie (not shown) to secure the cable 614. The antenna so-formed is simply inserted in the mould (not shown) for forming the inner core 406" along with the battery 502. Again, the leads 209 and cable 614 are caught within the mould so as to extend out of the end 310 in parallel fashion (and not angled with respect to one another as shown in FIG. 9).

Figure 12:
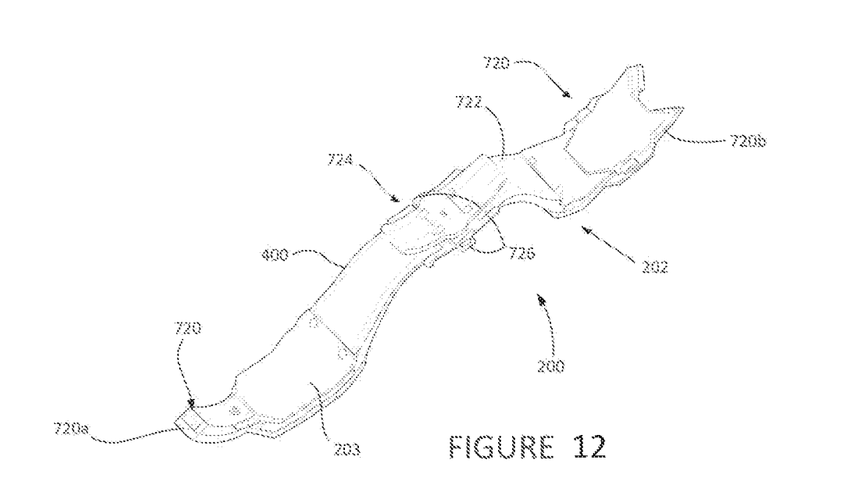
FIG. 12 is a view of a device in accordance with the invention shown in an open condition.

Turning to FIG. 12, a complete device 200 in accordance with the invention is shown in an open position (it is closed in FIG. 1). Here, the housing 203 is shown connected to the pouch 400 and forming part of the band 202. The other end of the housing 203 forms the first part 720a of a separable coupling mechanism 720 whose second part 720b is shown detached from the first part. The second part 720b is connected at its other end to one end of a second flexible element 722 corresponding in appearance and flexibility with the pouch 400 and being connected to the second part 720b in like manner that the pouch 720 is connected to the housing 203. The band 202 is completed by an expandable mechanism 724 having buttons 726 enabling the band to expand for one form of release from a user's wrist. The mechanism 724 has multiple inter-pivoted levers which, when the buttons 726 are squeezed together, enable the mechanism to unfold allowing the connected ends of the flexible parts 400,722 to flex outwardly significantly expanding the area enclosed by the band 202 and facilitating removal from, and fitting on, of the device 200 on a user's wrist. It should be noted that the coupling mechanism 720 is intended to provide a rigid inter-connection, once formed, so that the housing 203 and connector 720 together form a single rigid component, albeit shaped to cover a user's wrist. The first part 720a comprises a male part that slides into a receptor on the female part 720b, which has a releasable catch mechanism provided (not shown or explained further in detail) to lock the parts together until a release button is pressed.

As described above with reference to FIG. 3, the inner core 406 (406', 406", 406'") has different regions over its length from its connection to the housing, to its tail. The region 318 is flexible, but is held in position, both by interaction of the head 310 in the opening 211 in the housing, and by the securing of the fasteners 215 with, and in, the pouch 400. However, immediately adjacent the housing 203, the inner core 406 is capable of flexion, primarily about an axis parallel a line joining the fasteners 215 and apertures 412 (indeed, parallel a central axis of the band 202, coincident with the long axis of a user's wrist and forearm when the device 200 is being worn). In this region, the wires 209 and coaxial cable 614 are subjected to flexing when the device 200 is donned and removed from a user's wrist. The support provided by the overmoulded polyurethane protects these elements, however disposing them in an S-shape in this flexing region reduces tension changes in the cable and wires as flexion occurs. Desirably, once within the housing 203, the coaxial cable and the wires 209 are tied to the PCB close to the entry to the housing 203 so that strain relief between their connections to the PCB 702 and the ties on the PCB is provided. However, this is not shown in the drawings.

As mentioned above, the coin-cell battery 502 may be a single-use battery. Alternatively, it may comprise a rechargeable cell, or a capacitor. In that event, a recharging circuit may be provided that may comprise a recharging coil to receive an alternating magnetic flux which drives an alternating voltage in the recharging coil. A circuit may be additionally disposed on the circuit board 702 to shape the generated alternating voltage to charge the rechargeable cell. The alternating magnetic flux is generated externally of the device 100, such as by the charging clamp 300. Our co-pending application number GB 1709860.9 filed 20 Jun. 2017 describes a suitable arrangement. The recharging coil may also be disposed in the inner core 406,406', or at a different location of the device 200.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A wearable suitable for wearing on a person's wrist and comprising a metallic housing and a flexible band for attachment of the device to a user's wrist,
wherein the metallic housing includes a printed circuit board (PCB) on which is mounted electronic components including a transmitter for transmitting radio signals at a frequency between 400 and 1000 MHz;
wherein a coin-cell battery powers the device, the battery being disposed in a section of the flexible band and electrical connections being provided between the battery and PCB; and
wherein the transmitter comprises a coaxial cable connector and a coaxial cable having a terminal for connection to said coaxial cable connector and extending out of said housing into said section, the coaxial cable comprising a conductive core and a radio-frequency-shielding sheath, wherein an exposed portion of the conductive core extends beyond the radio-frequency shielding sheath, and
wherein the transmitter further comprises an antenna comprising the exposed portion of the conductive core within said section, and wherein said section includes:
a backbone having notches around which said exposed portion of the conductive core is wound; or
a backbone having grooves around which said exposed portion of the conductive core is wound.

2. The device as claimed in claim 1, wherein said antenna is a monopole antenna.

3. The device as claimed in claim 1, wherein said backbone comprises a clamp securing said coaxial cable to the backbone and providing strain relief to the side of the coaxial cable comprising said termination and conductive core and in respect of tension in the coaxial cable on the other side of the clamp.

4. The device as claimed in claim 3, wherein said clamp also serves to secure the battery and its electrical connections to the backbone.

5. The device as claimed in claim 3, wherein said clamp is formed by a base and a former defining a groove therebetween to receive and clamp the coaxial cable on engagement of tightening means.

6. The device as claimed in claim 5, wherein a corresponding groove is provided on an underside of the former terminating in an aperture in the former opening on its topside as a track in the topside turning the exposed portion of the conductive core when received therein so as to facilitate winding of the exposed portion of the conductive core around the former, alternating grooves being formed on the topside and underside to receive the exposed portion of the conductive core.

7. A wearable device as claimed in claim 1,
wherein the metallic housing includes first electronic components providing functionality for the device; and
wherein the flexible band comprises a section moulded from resiliently flexible plastics material in which is embedded further electronic components of the device, an electrical connection between said first and second electronic components bridging said metallic housing and flexible band.

8. The device as claimed in claim 7, wherein said further electronic components comprise said coin-cell battery and said antenna.

9. The device as claimed in claim 1, wherein said section comprises a head received through an opening in said rigid housing, which opening is sealed by said head, and through which head said electrical connection passes.

10. The device as claimed in claim 9, wherein the battery is disposed in a battery region of the section, where the section is of reduced flexibility, a flex region being between said battery region and said head, and a tail region being on the other side of said battery region with respect to said flex region, which flex and tail regions are resiliently flexible.

11. The device as claimed in claim 10, wherein a connection region of the section is between said head and flex region, fixing means being provided to secure said connection region to said housing.

12. The device as claimed in claim 11, wherein said connection region comprises at least two apertures to receive fasteners for connection of the section to the housing.

13. The device as claimed in claim 9, wherein said section is received within a pouch comprising a resiliently flexible elastomeric tray and a lid attached around a lip of the tray and providing an aesthetic cover of the band over the section.

14. The device as claimed in claim 13, wherein said aesthetic cover is a leather strap stitched to the lip.

15. The device as claimed in claim 13, wherein either or both said tray and lid have at least two apertures coinciding with said apertures in the section to also receive said fasteners and secure the pouch also to the housing.

16. The device as claimed in claim 9, wherein said housing on its side remote from the section has an extension comprising a first latch for separable connection to a second latch.

17. The device as claimed in claim 16 wherein said section is received within a pouch comprising a resiliently flexible elastomeric tray and a lid attached around a lip of the tray and providing an aesthetic cover of the band over the section, and wherein the second latch has a resiliently flexible part connected thereto that matches the pouch connected to the housing.

18. The device as claimed in claim 17, wherein said flexible part and pouch are interconnected at their ends remote from the housing by a selectively expandable mechanism that completes the band of the device.

19. The device as claimed in claim 1, wherein said section of the flexible band comprises a moulding of polyurethane elastomer.

20. The device as claimed in claim 19, wherein said antenna and battery are embedded in said moulding, the polyurethane elastomer and the antenna forming a composite antenna, said electrical connections protruding from said moulding for connection to the PCB and wherein said coaxial cable also protrudes from said moulding for connection to the PCB.

21. The device as claimed in claim 1, wherein the device is selected from the group comprising:
a. a remote control for keyless entry to a vehicle; and
b. a remote control for keyless entry to a building or to a room within a building.

22. The device as claimed in claim 1, wherein a length of a wound segment of the exposed portion of the conductive core is dependent on an RF transmission frequency of the transmitter.

23. The device as claims in claim 19, wherein a length of a wound segment of the exposed portion of the conductive core is dependent on an RF transmission frequency of the transmitter and a dielectric property of the polyurethane elastomer.

* * * * *